United States Patent Office 3,166,784
Patented Jan. 26, 1965

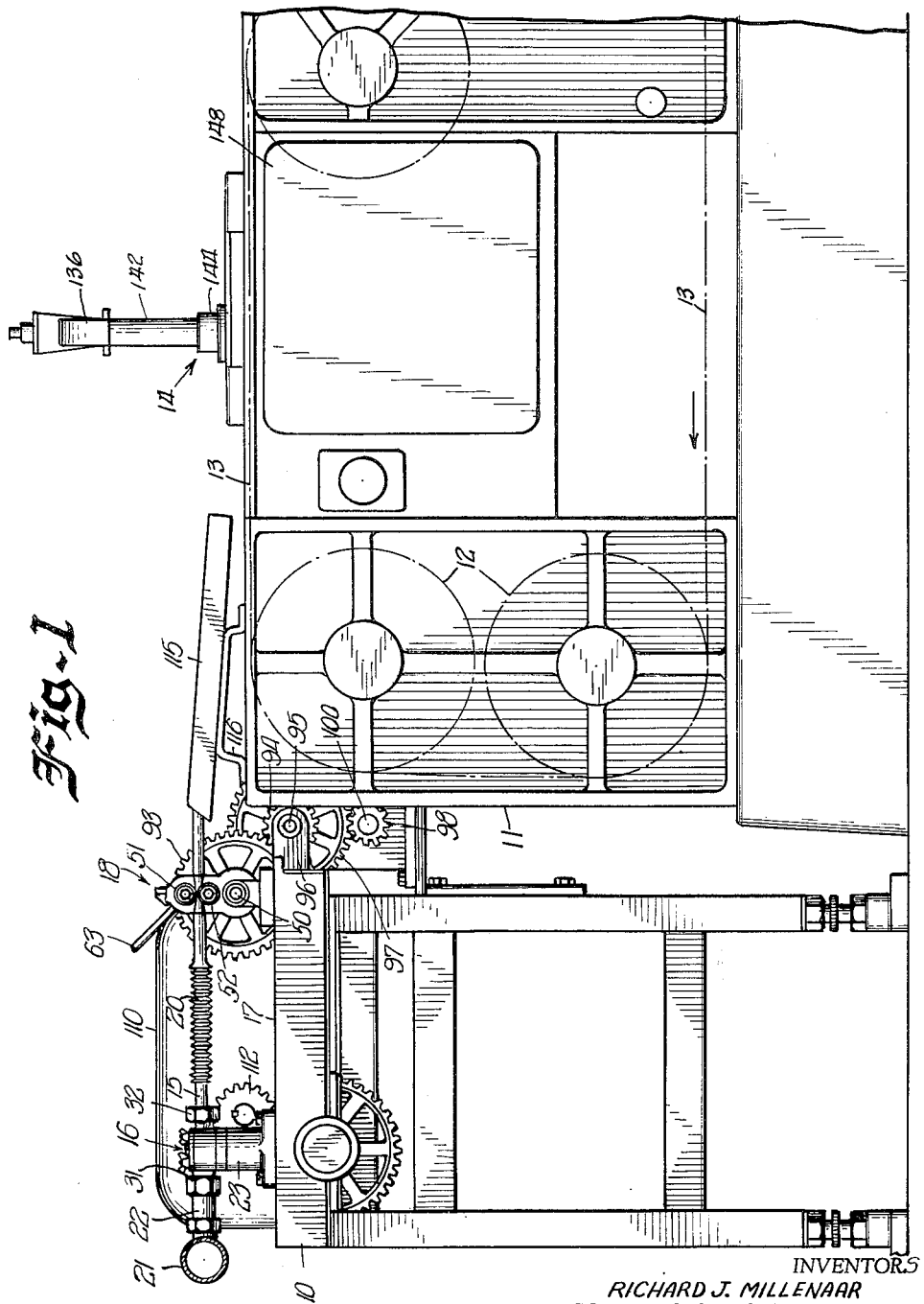

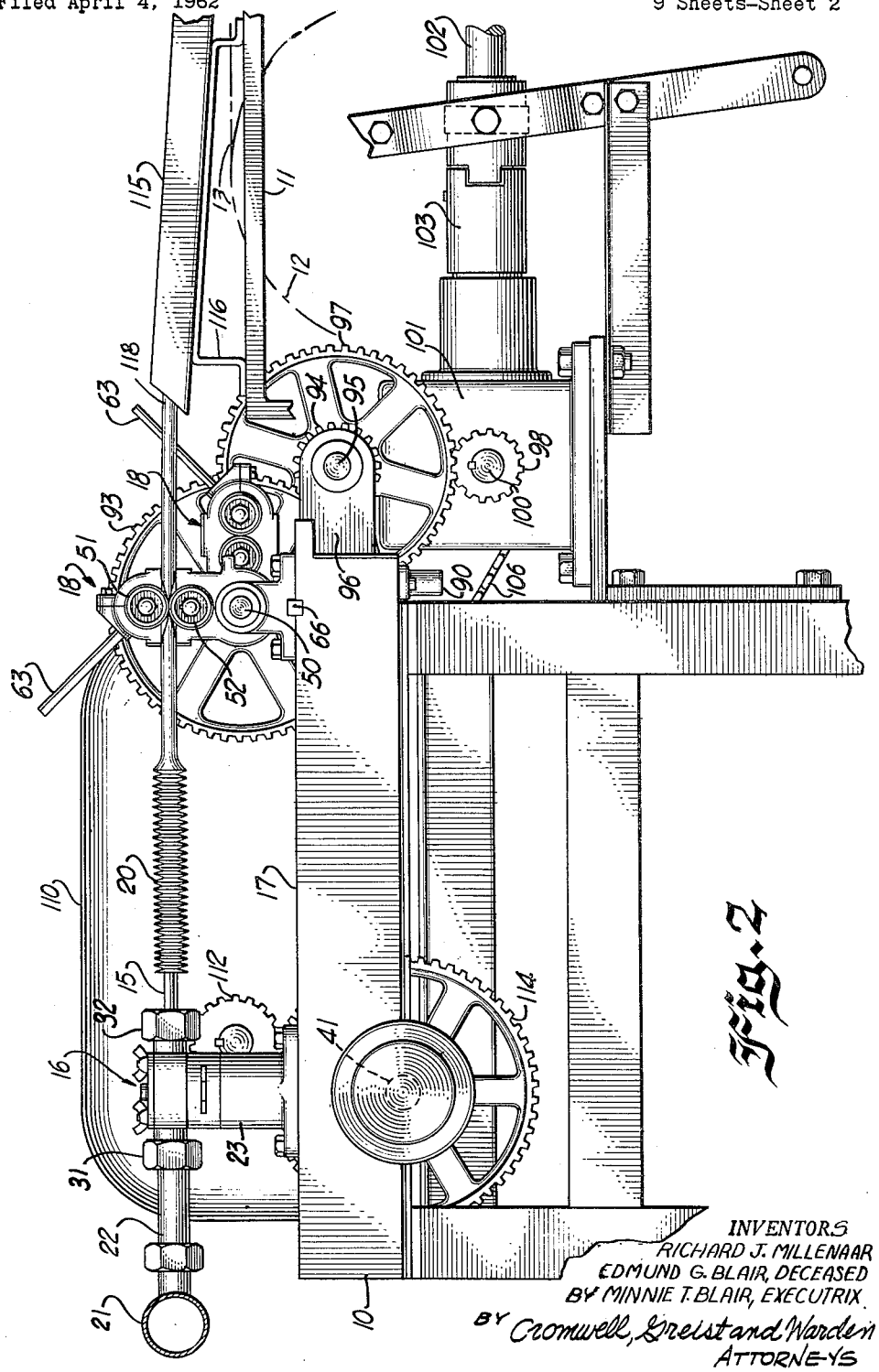

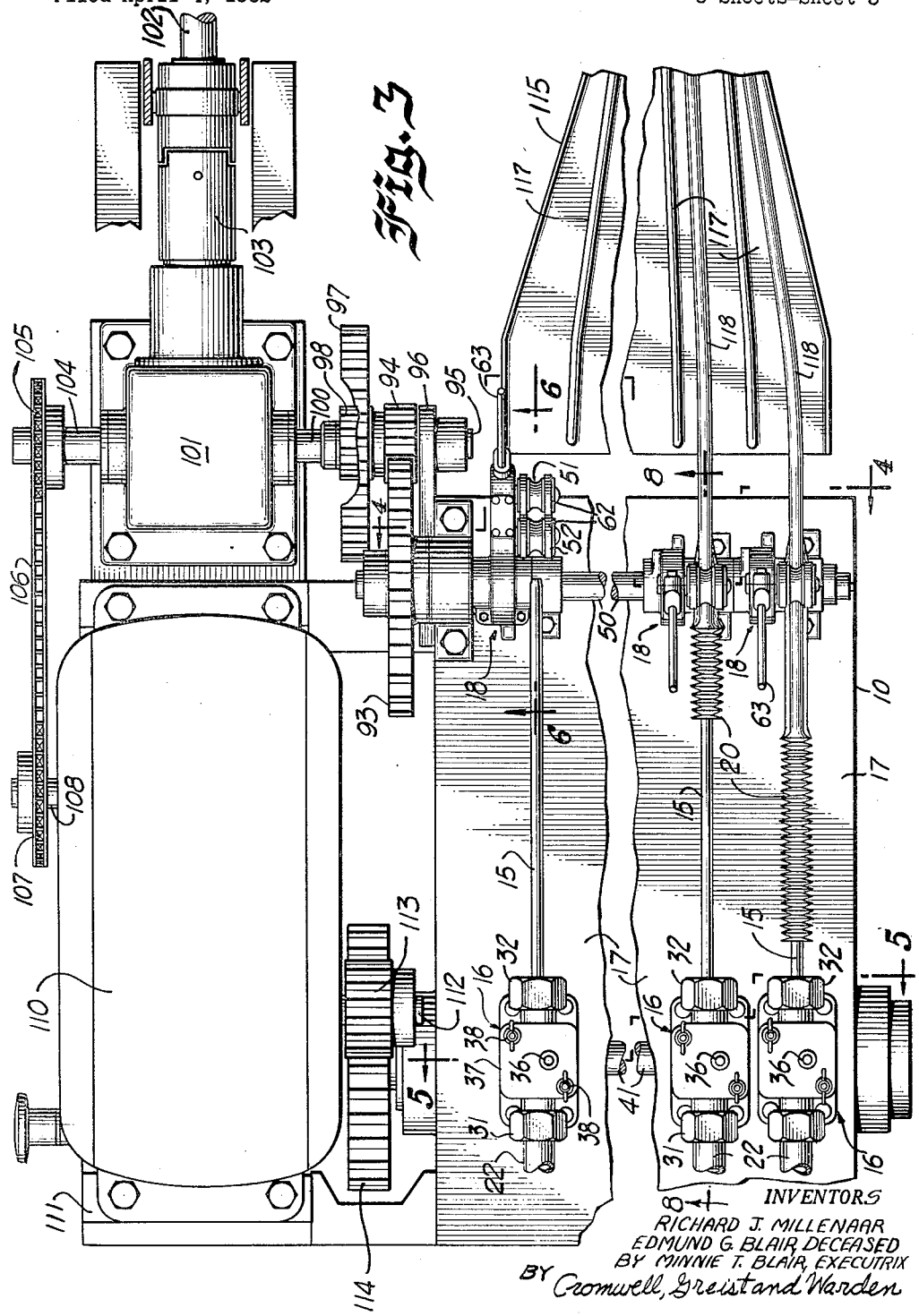

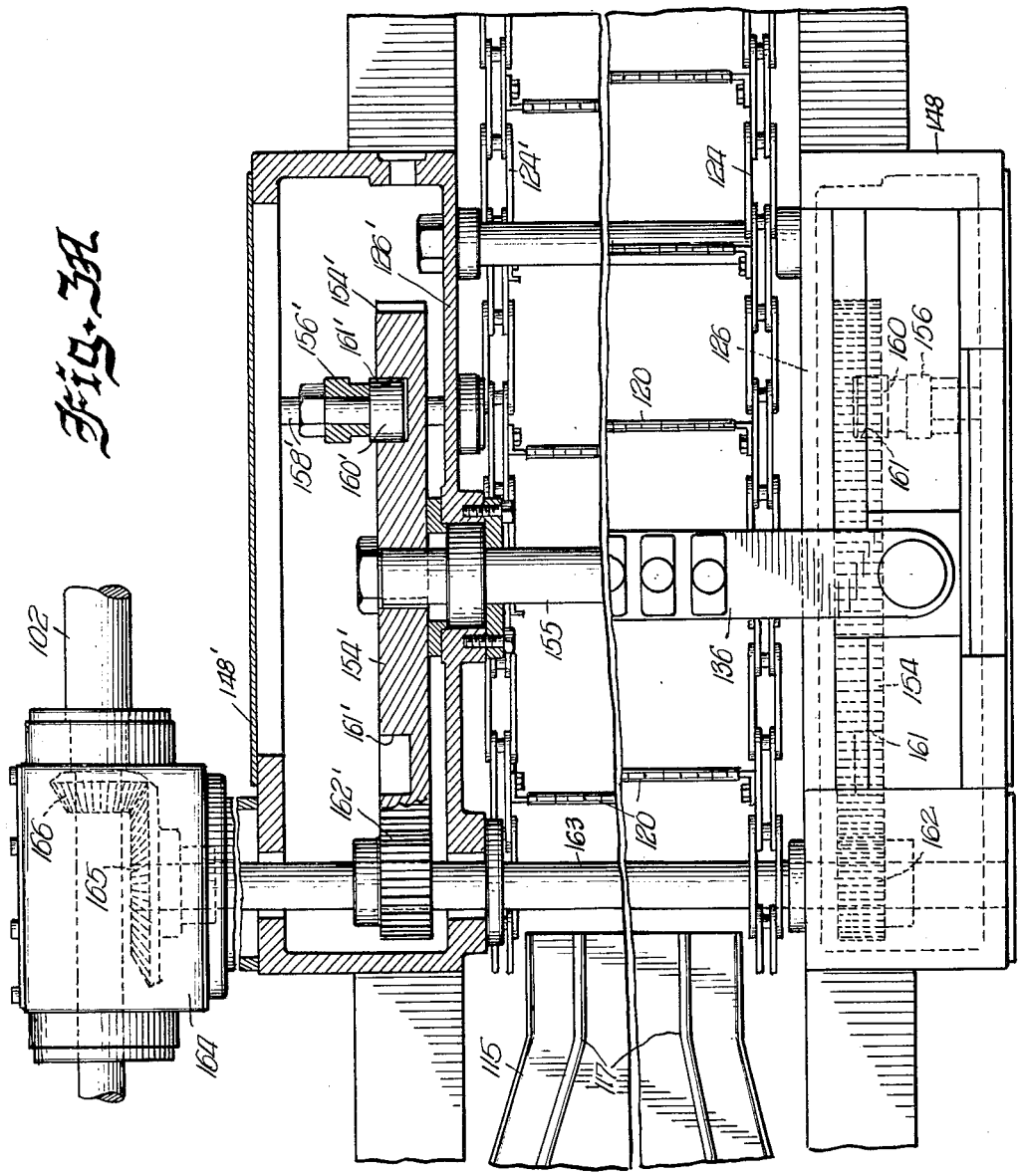

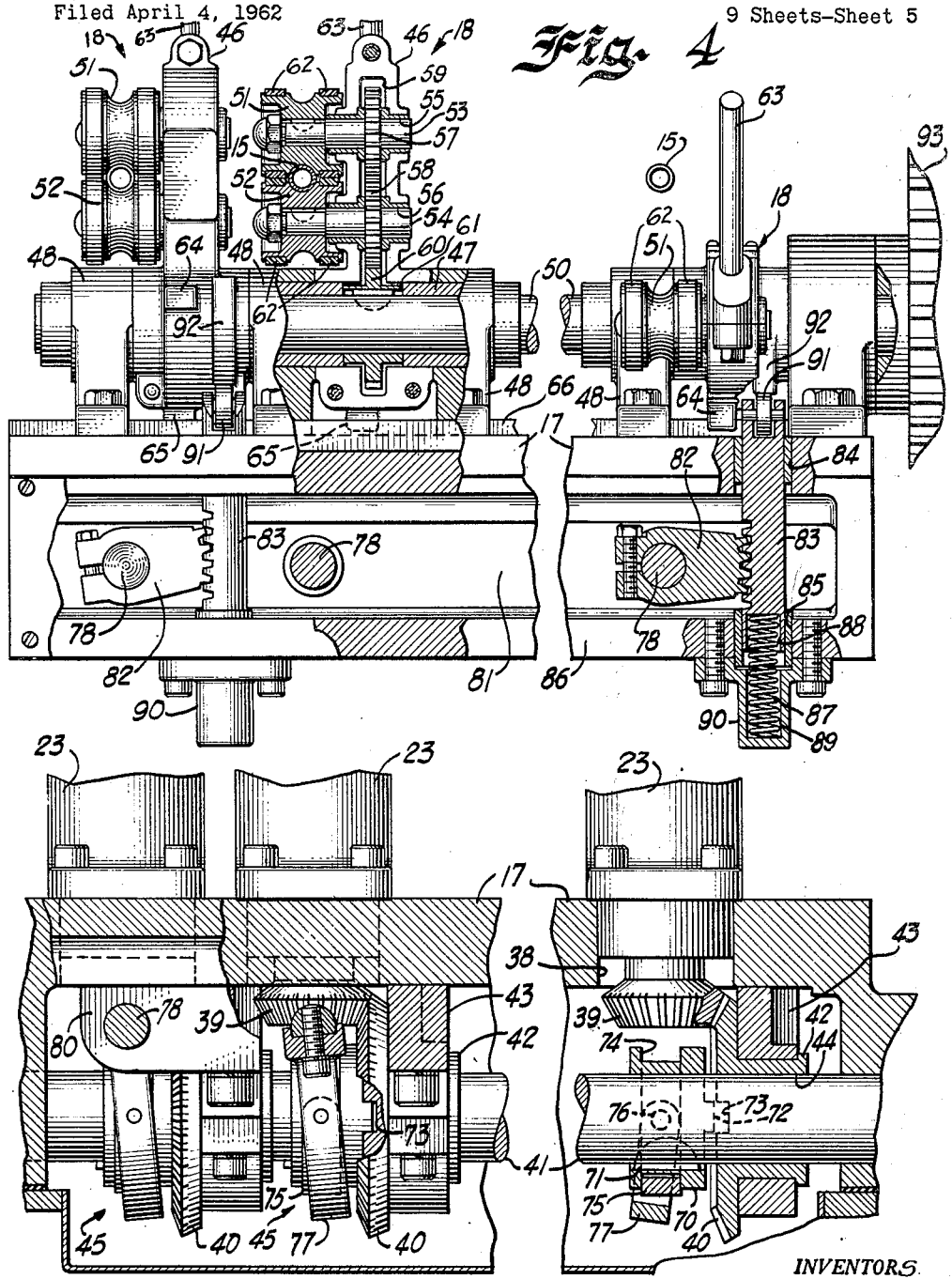

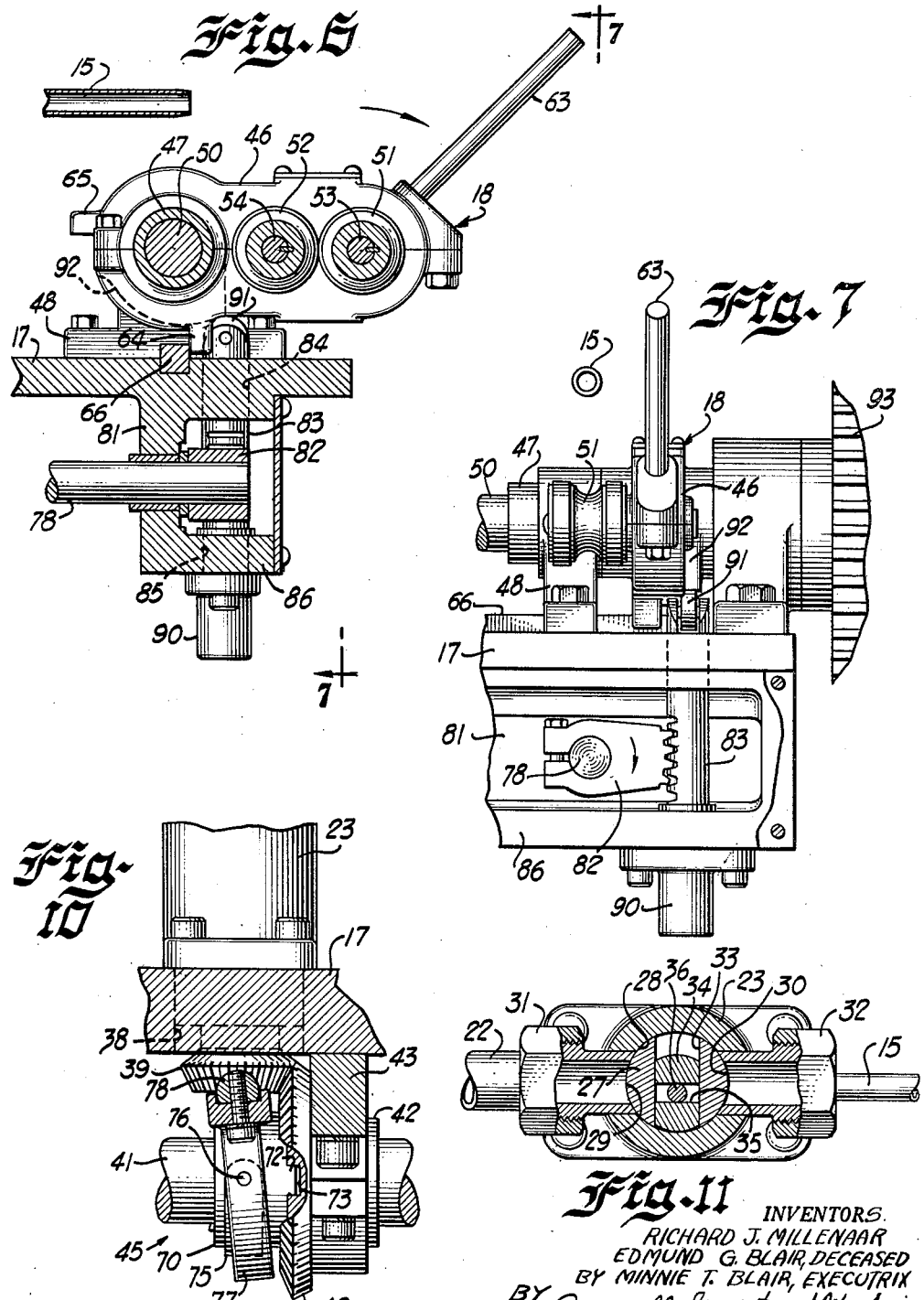

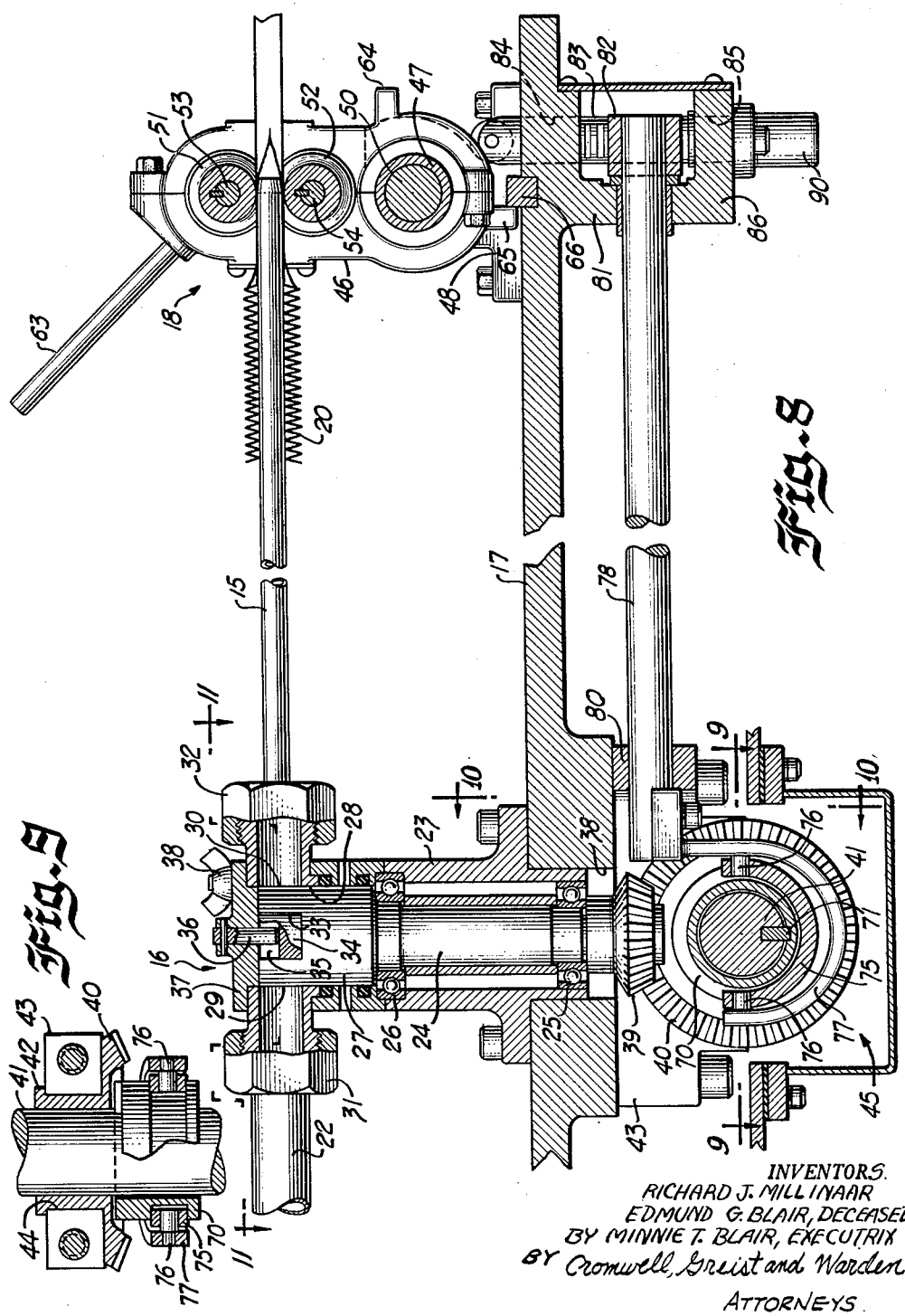

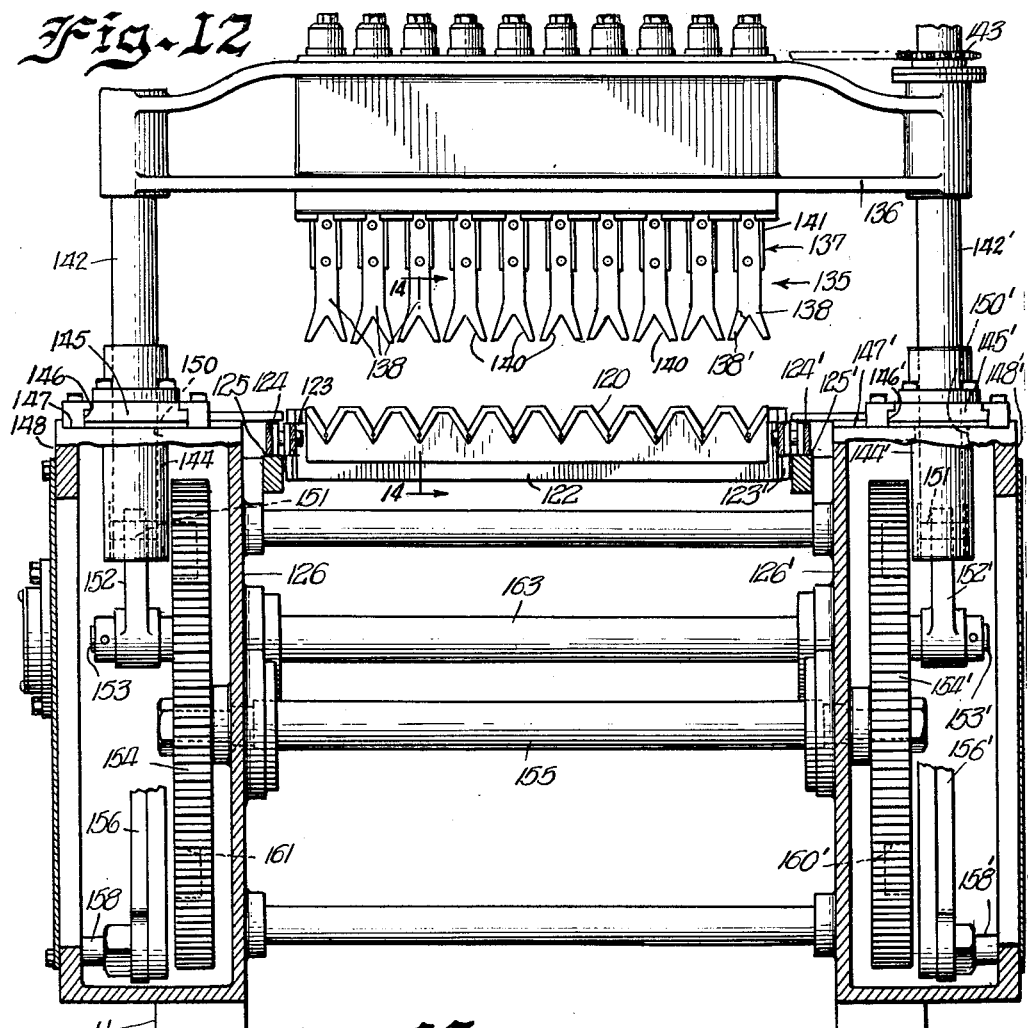
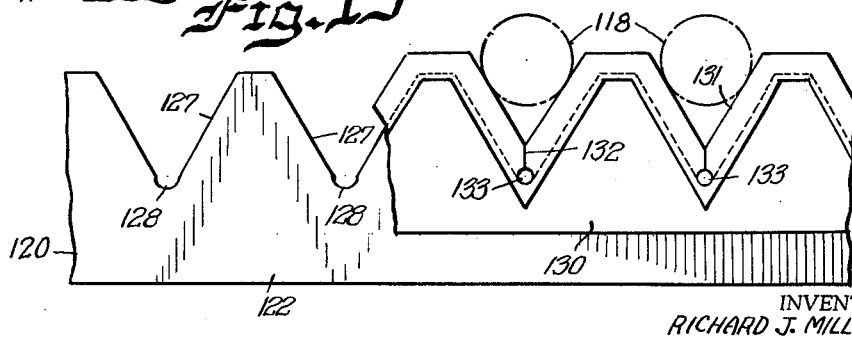

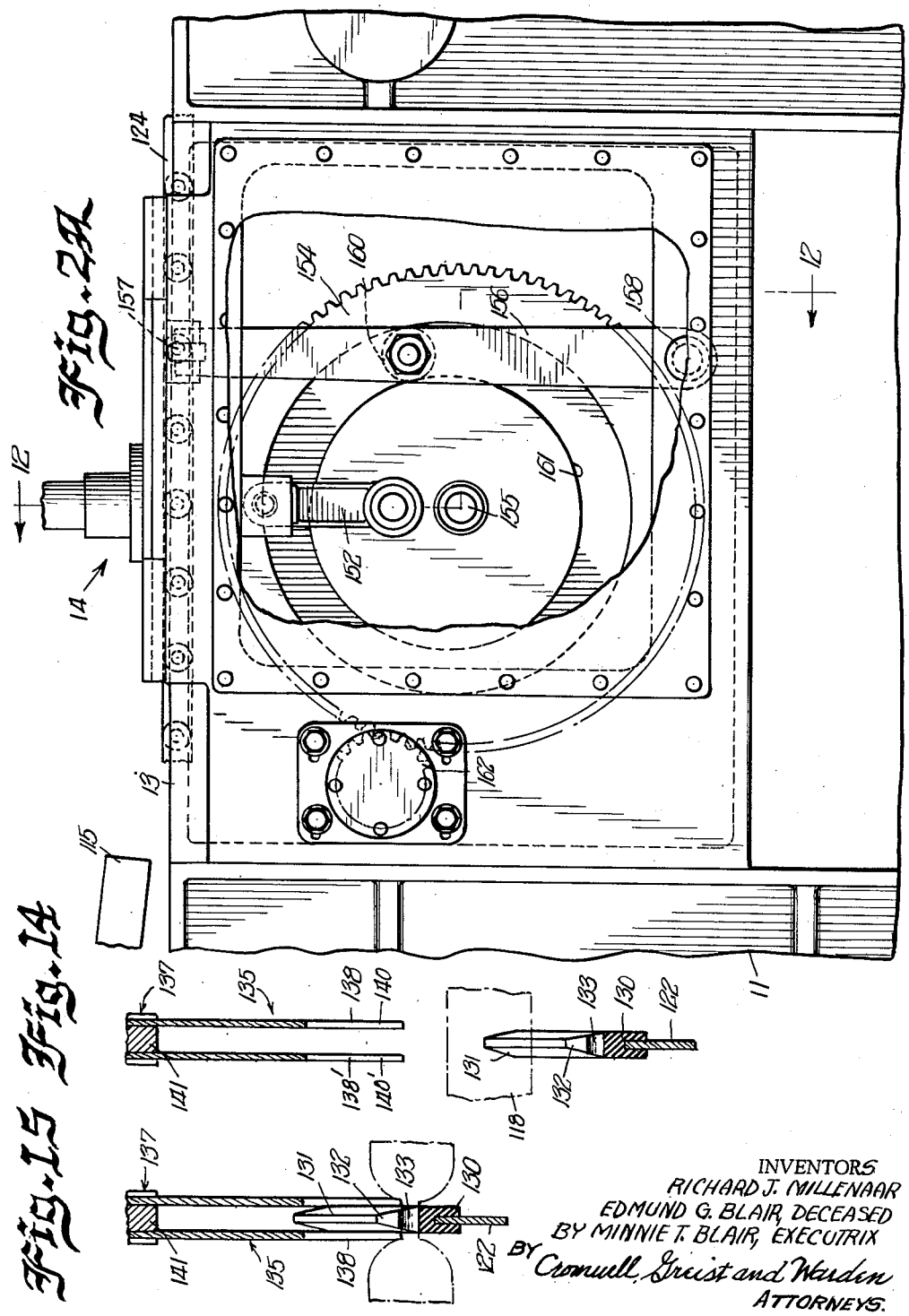

3,166,784
SAUSAGE STUFFING AND LINKING APPARATUS
Richard J. Millenaar, Charlottesville, Va., and Edmund G. Blair, deceased, late of Madison, Wis., by Minnie T. Blair, executrix, Madison, Wis., assignors to Oscar Mayer & Co., Inc., Chicago, Ill., a corporation of Illinois
Filed Apr. 4, 1962, Ser. No. 185,167
12 Claims. (Cl. 17—33)

This invention relates to the manufacture of sausages wherein relatively long lengths of casing are stuffed or filled with the sausage batter, the stuffed casing is divided into links by constricting the same at intervals corresponding to the desired length of the sausages, and thereafter the links are cooked or smoked while they are held in connected relation.

It has been proposed to provide a sausage manufacturing or processing apparatus which will automatically divide a filled or stuffed casing into sections of predetermined length by constricting the casing at intervals to thereby form the stuffed casing into links and which will thereafter convey the connected links in a continuous string through a series of chambers for smoking and cooking the same. One such apparatus has been disclosed in copending application Serial No. 786,168, filed January 12, 1959, now Patent No. 3,059,272, dated October 23, 1962. Such apparatus requires for successful operation a mechanism for supplying in a substantially continuous manner stuffed casing to a mechanism for forming the links and subsequently conveying the formed links through the smoking and cooking chambers and it is a general object of the present invention to provide for incorporation in such apparatus a means for stuffing one or more relatively long lengths of sausage casing with a sausage mixture or batter and delivering the same in a continuous and uniform manner to a continuously traveling conveying mechanism on which the links are formed and then conveyed through the apparatus for processing.

It is a more specific object of the invention to provide an apparatus for stuffing simultaneously a plurality of lengths of sausage casing and thereafter forming sausage links by dividing the stuffed casing into sections of predetermined length and constricting the casing between the sections wherein the flow of the batter to the individual casing lengths is controlled so that uniformity is obtained in the sausage links which are subsequently formed.

It is a still more specific object of the invention to provide a casing stuffing and linking apparatus which comprises a series of stuffing nozzles each connected to a common supply conduit and flow metering devices associated with each of the nozzles and operated to control the flow of the batter through the nozzles so as to obtain uniformity in the stuffed casings and in the links which are subsequently formed therein by associated linking mechanism.

It is a further object of the invention to provide a sausage stuffing apparatus which comprises a series of stuffing nozzles each having associated therewith a casing feeding device and a batter metering device for controlling the flow of the batter through the nozzles and into the casing so that a uniform quantity of batter is delivered to each length of casing.

These and other objects and advantages of the invention will be apparent from a consideration of the apparatus which is shown by way of illustration in the accompanying drawings wherein:

FIGURE 1 is a side elevation of a casing stuffing and link forming apparatus embodying the principal features of the invention;

FIGURE 2 is a side elevation, to an enlarged scale and with portions broken away, of the sausage stuffing portion of the apparatus;

FIGURE 2A is a side elevation, to an enlarged scale and with portions broken away, of the link forming portion of the apparatus;

FIGURE 3 is a plan view of the stuffing apparatus to an enlarged scale and with portions thereof broken away;

FIGURE 3A is a plan view of the link forming apparatus, to an enlarged scale, and with portions thereof broken away;

FIGURE 4 is a vertical cross section taken on the line 4—4 of FIGURE 3, to an enlarged scale;

FIGURE 5 is a vertical cross section taken on the line 5—5 of FIGURE 3, to an enlarged scale and with portions broken away;

FIGURE 6 is a partial vertical section taken on the line 6—6 of FIGURE 3, to an enlarged scale and with portions broken away, the view showing one of the casing feeding devices moved to non-feeding position;

FIGURE 7 is a fragmentary elevational view taken on the line 7—7 of FIGURE 6;

FIGURE 8 is a longitudinal vertical section taken on a plane indicated at 8—8 in FIGURE 3, to a larger scale and with portions broken away;

FIGURE 9 is a fragmentary horizontal cross section taken on the line 9—9 of FIGURE 8;

FIGURE 10 is a fragmentary vertical section taken on the line 10—10 of FIGURE 8;

FIGURE 11 is a fragmentary horizontal cross section taken on the line 11—11 of FIGURE 8;

FIGURE 12 is a vertical section taken on the line 12—12 of FIGURE 2A to a smaller scale and with portions broken away;

FIGURE 13 is a fragmentary elevation to an enlarged scale showing a portion of one of the link forming bars;

FIGURE 14 is a fragmentary section taken on the line 14—14 of FIGURE 12 to an enlarged scale; and FIGURE 15 is a fragmentary section similar to FIGURE 14 with the link forming members in a different position.

Referring to FIGURE 1 of the drawings, the stuffing apparatus is mounted on an upright supporting frame 10 which is positioned at the receiving end of an upright supporting frame 11 carrying a vertically spaced pair of end sprockets 12 of a linking and transporting conveyor 13 having an upper run which moves past a linking station 14 where the stuffed sausage casings are linked, after which they are carried by the conveyor 13 through processing chambers (not shown) in which the links are cooked and smoked or otherwise processed.

The stuffing apparatus comprises a series of horizontally disposed stuffing nozzles 15 (FIGURES 1 to 3) which are supported in longitudinally extending, transversely spaced relation on upright metering devices 16, the latter being arranged in transverse alignment at the trailing end of the frame plate 17 which forms the top structure of the upright supporting frame 10. Each of the stuffing nozzles or horns 15 extends between the metering device 16 to which it is connected at one end and a casing feeding device 18 which is spaced forwardly of the metering device so that a plurality of the feeding devices 18 extend transversely of the plate 17 adjacent the leading edge thereof and with each such feeding device in longitudinal alignment with one of the metering devices 16. Each of the stuffing nozzles 15 is, of course, adapted to receive in shirred relation thereon a quantity of a casing 20 to be stuffed which ordinarily will be a length thereof in the neighborhood of 50 to 100 feet, the empty casing 20 being initially gathered onto the stuffing nozzle and subsequently fed therefrom, after the leading end is tied, by movement of the batter through the metering device 16, the latter controlling the flow of the batter through the stuffing nozzle 15 which is connected thereto.

Each of the metering devices 16 (FIGURES 1, 2, 8 and 11) is connected to a transversely disposed common supply conduit 21 by a relatively short connecting conduit 22 which forms the feed pipe or conduit for the metering device. The main supply conduit 21 is in turn connected to a supply pump (not shown) which delivers the batter to the conduit 21 under a predetermined constant pressure. The individual metering devices 16 control the flow of the batter into the stuffing nozzles 15 and these metering devices 16 are operated as hereinafter described so as to achieve the correct weight in the finished product.

Each of the metering devices 16 (FIGURES 8 and 11) comprises an upright cylindrical housing forming member 23 having a vertically disposed cylindrical operating spindle 24 rotatably mounted therein by means of the vertically spaced bearings 25 and 26. The upper end or head portion 27 of the spindle 24 is of enlarged diameter and rotates in the vertical bore 28 in the uppermost portion of the housing 23 between the inlet and discharge openings 29 and 30, the latter being connected by suitable couplings 31 and 32 with the feed pipe 22 and the nozzle 15, respectively. The spindle head 27 is provided in the top with a diametrical slot 33 of rectangular cross section which receives a horizontally disposed plunger member 34, the latter having a cross slot 35 in its upper face into which projects the lower end of a pin 36 which depends from a top closure plate 37. The closure plate 37 is secured in position by a pair of stud and thumb screw fasteners 38. The pin 36 is on an axis offset relative to the axis of the spindle 24 so that upon rotation of the spindle 24 the plunger 34 moves back and forward in the slot 33 in the top of the plunger head 27. The plunger 34 is of less length than the length of the slot 33 and is operated by the pin 36 in timed relation to the rotation of the spindle 24 so as to deliver measured charges of a batter from the inlet port 29 to the outlet port 30 of the device, thereby insuring a constant and uniform flow of the batter through the stuffing nozzle 15. As clearly evident from FIGURES 8 and 11, the nozzle 15 has a smaller diameter than the outlet port 30 and the associated coupling 32 and the pulsating movement of the plunger 34 provides a continuously moving stream of batter at the end of the nozzle for stuffing the casing.

The supporting plate 17 is apertured at 38 to receive the lower end of the spindle housing 23 which is bolted or otherwise secured to the plate 17. The spindle 24 is of sufficient length to extend beneath the plate 17 and has a miter gear 39 secured on its lower end which is in toothed engagement with a cooperating miter gear 40 on a cross drive shaft 41. The gear 40 has a hub portion 42 which is rotatably mounted in a bearing bracket 43 depending from the lower face of the top frame plate 17 and the drive shaft 41 extends through the bore 44 in the hub 42 so that the gear 40 is mounted on the drive shaft 41 for free rotation. It is connected in driving relation with the shaft 41 by means of a clutch mechanism 45 which will be hereinafter described in detail.

Each of the filled casing feeder devices 18 (FIGURES 2, 6, 7 and 8) is aligned, in the longitudinal direction of the machine, with an associated stuffing nozzle 15 and its metering device 16. The feed devices 18 are spaced forwardly of the metering devices 16 and aligned transversely of the machine. Each of the feeder devices 18 comprises a plate-like, two part housing forming bracket 46 which is disposed in a longitudinal, vertical plane and mounted for pivotal movement about a tubular housing or bearing forming member 47 which is supported by transversely spaced, upright bearing brackets 48 and which receives a drive shaft 50, the latter being parallel with the drive shaft 41. The bracket or housing 46 supports a pair of cooperating grooved casing engaging rollers 51 and 52 which are secured on the free ends of spaced parallel stub shafts 53 and 54 extending from the housing 46. The shafts 53 and 54 are rotatably mounted in the housing 46 by means of suitable bearing members 55 and 56 and carry interengaging gears 57 and 58 within the gear chamber 59 in the housing 46. The gear 58 which is adjacent the drive shaft 50 is in driving engagement with a gear 60 which is keyed to the drive shaft 50 and extends through a slot 61 in the tube 47 so that rotation of the shaft 50 drives the casing engaging rollers 51 and 52. The rollers 51 and 52 are provided with cooperating pairs of casing gripping tire members 62 of resilient rubber-like material which grip side edges of the casing 20 and advances the casing 20 beyond the free end of the nozzle 15. The housing 46 is provided at its free end with a handle 63 for use in swinging the housing from a vertical position, as shown in FIGURE 8, where the drive rollers 51 and 52 are properly aligned with the end of the nozzle 15 for receiving the casing 20 therefrom to a horizontal, inoperative position as shown in FIGURE 6 where the housing does not interfere with reloading of the nozzle 15 with a new casing 20, when the supply of casing on the nozzle has been exhausted. The housing 46 is provided on the pivoted end with stop members 64 and 65 which extend radially of the axis of the supporting shaft 50 in peripherally spaced relation and cooperate with a fixed stop member 66 projecting above the top plate 17 on which the apparatus is mounted so as to limit the swinging movement of the housing 46 to the two positions shown in FIGURES 6 and 8.

Each of the casing feeder devices 18 is arranged to automatically discontinue the operation of the associated product metering device 16 when the feeder device 18 is moved to the non-feeding position as shown in FIGURE 6.

Each clutch mechanism 45 comprises a clutch sleeve 70 (FIGURES 5, 8, 9 and 10). The clutch sleeve 70 is mounted for axial sliding movement on the drive shaft 41 and is held against rotation relative to the shaft 41 by an axially extending key 71 (FIGURE 5). The sleeve 70 has a plurality of axially extending, peripherally spaced teeth 72 on the end thereof which is adjacent the gear 40 which teeth are adapted to engage in cooperating recesses 73 in the face of the gear 40 so that when the sleeve 70 is moved axially to bring the toothed end into engagement with the gear 40 the gear and sleeve interlock so that the gear 40 is rotated with the shaft 41. The sleeve 70 is provided with a peripheral recess 74 on its exterior wall which receives a C-shaped slide member 75 having pivot pins 76 extending from its opposite ends which connect the same with a C-shaped operating yoke 77. The yoke 77 is secured on the end of an actuating shaft 78 (FIGURE 8) and the shaft 78 is mounted beneath the support plate 17 in depending bearing bracket members 80 and 81 which are spaced in the longitudinal direction of the machine with the bearing bracket 80 forming a part of the bracket 43 beneath the metering device and the bracket 81 located immediately below the casing feeding device 18. The clutch operating shaft 78 has a gear segment 82 (FIGURES 4, 6, 7 and 8) mounted on its forward end which is in toothed engagement with a vertically disposed rack member 83. The rack member 83 is mounted for vertical sliding movement in suitable bearings in vertically aligned apertures 84 and 85 provided in the top plate 17 and a horizontally disposed bottom leg or flange 86 on the depending bracket 81 which is spaced below the plate 17. The rack member 83 is normally urged in the upward direction by a compression spring 87 which is seated at its upper end in an axially extending pocket 88 in the lower end of the rack member 83 and at its lower end in an axially aligned pocket 89 formed in a spring housing 80 which is bolted or otherwise secured to the bottom of the bracket 81. The upper end of the rack 83 is bifurcated and carries a cam roller 91 extending above the top surface of the plate 17 and engaging with a cam surface or track 92 formed on the pivoted end of the housing 46. Rotation of the housing 46 about the shaft 50 causes vertical movement of the rack 83 which rotates the shaft 78 and swings the yoke 77 to move the clutch sleeve 70 into or out of engagement with the gear 40 so that, when the housing 46 is in the upright position, as shown in FIGURE 8, with the feed rollers 51 and 52 being in driving engagement with the filled casing 20, the clutch sleeve 70 is locked with the gear 40 and the spindle 24 of the metering mechanism 16 is rotated to deliver the batter through the nozzle 15. When the housing 46 is swung to the inoperative position, as shown in FIGURE 6, the vertically disposed rack 83 is shifted downwardly to disengage the clutch mechanism 45 (FIGURE 5) which stops the feed of the batter through the nozzle 15 while a new length of casing is being placed thereon.

The two drive shafts 41 and 50 are connected to a common drive mechanism at one side of the supporting frame 10. The shaft 50 is extended at one end and carries a gear 93 (FIGURES 1 to 3) which is in engagement with a pinion 94 on an idler shaft 95. The shaft 95 is mounted in a bearing bracket 96 secured on the supporting frame 10 at the forward edge thereof and carries a gear 97 which engages with a pinion 98 on a drive shaft 100 extending from the journal box 101, the latter deriving its power from a main drive shaft 102 extending longitudinally of the machine and having a coupling 103 connecting the same with an input shaft from the journal box. A power shaft 104 extends from the other side of the journal box 101 and carries a sprocket 105 which is connected by a chain 106 with a sprocket 107 on the input shaft 108 of a variable speed unit 110. The variable speed unit 110 and the journal box 101 are mounted on a suitable supporting structure 111 adjacent the main supporting frame structure 10. The output shaft 112 of the variable speed unit 110 carries a pinion 113 which engages in driving relation with a gear 114 on an extended end of the drive shaft 41 for the metering devices 16.

The casing feeding rollers 51 and 52 advance the casing from the stuffing nozzles 15 to a guide tray 115 (FIGURES 1 to 3A) which is supported in generally horizontal position on the top of the frame 11 by the bracket 116. The tray 115 is divided by longitudinal partitions 117 which guide the stuffed casings 118 to the link forming station 14 (FIGURES 2A, 3A and 12) where the stuffed casings 118 are laid on cross bar assemblies 120 which are carried in longitudinally spaced relation on the conveyor 13 and each of the stuffed casings 118 is divided into a connected series of individual sausage links, with each link being of a length corresponding to the distance between the cross bar assemblies 120.

Each of the cross bar assemblies 120 comprises a plate-like bar member 122 (FIGURES 12 to 15) which is attached at its opposite ends by brackets 123 and 123' to chain links on the laterally spaced endless chains 124 and 124', the latter forming the conveyor 13. The chains 124 and 124' travel in guideways 125 and 125' in the side members 126 and 126' of the frame 11 so as to hold the cross bar assemblies 120 in a generally horizontal path at the linking station 14. Each bar member 122 has a series of outwardly opening, V-shaped slots or notches 127 spaced along its outermost edge which notches have side edges converging downwardly towards a bottom semi-circular pocket 128. Each bar member 122 has its notched margin encased in a cover member 130 formed of resilient material such as rubber or rubber-like plastic material, for example, "neoprene." The cover member 130 which is preferably molded on the bar 122 is formed with outwardly opening V-shaped slots or notches 131 having their side edges converging downwardly towards a vertical slit 132 which terminates at a circular neck forming aperture 133, the latter forming a pocket for receiving a constricted casing section which constitutes the connecting neck between adjoining links.

Each cross bar assembly 120 is adapted to receive the stuffed casings 118 in the V-shaped slots 131 with the casings being adapted to be constricted by operation of a neck forming device 135 which is mounted for vertical reciprocation above the conveyor 13 at the link forming station 14. The neck forming device 135 comprises a cross head 136 extending transversely of the frame 11 and having mounted thereon a series of constricting plate assemblies 137. Each constricting plate assembly 137 is aligned with a notch 131 on a cross bar assembly 120, and each comprises a pair of depending parallel plates 138 and 138' having aligned downwardly opening V-shaped slots or notches 140 and 140' in their lower edges. The plates 138 and 138' are carried on holders or mounting assemblies 141 which are suitably supported in the cross head 136 so that necessary adjustments may be made to properly align the notches 140, 140' for cooperation with the notches 131 in the cross bar assembly 120.

The cross head 136 is connected at its opposite ends to the upper ends of a pair of slide rods 142 and 142', with suitable chain connected mechanism indicated at 143 for adjusting the head 136 on the slide rods 142 and 142'. The slide rods 142 and 142' are mounted for parallel vertical movement in sleeve bearings 144 and 144' which are carried in slide blocks 144 and 145' which are mounted in guideways 146 and 146' formed by pairs of gibs secured on the top walls 147 and 147' of gear housings 148 and 148'. Longitudinally extending slots 150 and 150' are provided in the walls 147 and 147' to accommodate the bearings 144 and 144' which extend into the gear housings 148 and 148'. The slide rods 142 and 142' are connected at their lower ends by pivot pins 151 and 151' with connecting rods 152 and 152' which are connected by eccentrically disposed pivot pins 153 and 153' with plate cam and crank gears 154 and 154', the latter being disposed in the gear housings 148 and 148' on the ends of a supporting cross shaft 155 which is journaled in the vertically disposed side frame members 126 and 126'. The horizontal slide plates 145 and 145' are connected to the upper ends of the levers 156 and 156' by means of pivot members 157 mounted in the slotted ends of the levers. The slide operating levers 156 and 156' have their lower ends pivoted at 158 and 158' in the gear housings 148 and 148' and carry cam rollers 160 and 160' which travel in cam grooves 161 and 161' in the outer faces of the gears 154 and 154'. The gears 154 and 154' are driven by pinions 162 and 162' on the cross shaft 163 which is journaled at one end in the gear housing 148 and at the other end in the gear housing 164 which extends from the housing 148' at the other side of the machine. The shaft 163 carries a bevel gear 165 which engages with a bevel pinion 166 on the main longitudinally extending drive shaft 102.

In operating the apparatus, the nozzles 15 are each initially supplied with a section of casing 20 arranged in shirred relation thereon and the batter supply conduit 21 is connected to a suitable source of supply through a pressure pump. Before starting the flow of the batter, each casing has its leading end tied and threaded between the rollers 51 and 52, each housing 46 being in the non-feeding position. The variable speed unit 110 is adjusted to provide the desired flow of material through the metering devices 16 and flow through the latter is started by swinging the housings 46 to upright feeding position. The batter inflates the casing 20 as the flow of batter pushes the respective casings off of the ends of the nozzles 15 and beyond the feed rollers 51 and 52. The driven rollers 51 and 52 advance the filled casing to a guide tray 115 which is mounted on a bracket 116 above the frame 11 and which is partitioned, at 117, to guide the lines of stuffed casing to the linking bar assemblies 120 on the conveyor 13. The operator observes the movement of the casing 20 from each of the nozzles 15 and swings the housing 46 to inoperative position (FIGURE 6) when the length of casing 20 on any of the nozzles 15 is very nearly exhausted so that the trailing end may be pulled off manually and tied and a new length of casing may be fed onto the nozzle 15 and its leading end tied and threaded between the rollers 51 and 52 after which the housing 46 is returned to operative position and the feeding of the stuffed casing continues. Each nozzle 15 and its associated metering and casing feeding device 18 constitutes a separate assembly, subject to manual control of the operator, and any number of assemblies may be placed in operation, up to the full capacity of the apparatus. The variable speed unit 110 permits the adjustment of the flow of the batter to the metering units 16 so as to vary the pressure and thereby the density of the batter as it passes through the metering devices and through the nozzles to fill the casing.

The stuffed casing 118 is delivered to the cross bar assemblies so as to lie in the slots 131 (FIGURES 13 to 15). The cross bar assemblies 120 are advanced by the conveyor 13 to the linking station 14 and the cross head 136 is reciprocated in timed relation to the movement of each successive cross bar assembly 120 so that each pair of notched plates 138 and 138' aligns with a slot 131 and moves down over the cross bar assembly to constrict the casing and force the constricted portion into the pocket 133 as shown in FIGURE 15 where it remains until the processing is completed. The successive links thus formed are each of the same length by reason of the accurate spacing of the cross bar assemblies 120 on the conveyor 13 and with uniform feeding of the batter by the metering devices the links have the same content so that uniformity of product is achieved.

The apparatus is illustrated with the stuffing nozzles receiving shirred lengths of casing of a size which is presently available commercially. It is contemplated that longer lengths of the casing may be employed and also a casing of indefinite length which is supplied continuously as by continuous extrusion.

While particular materials and specific details of construction have been referred to in describing the illustrated form of the stuffing and link forming apparatus, it will be understood that other materials and equivalent details of construction may be resorted to within the spirit of the invention.

What is claimed is:

1. A sausage stuffing and feeding apparatus comprising a supply conduit, means to deliver a sausage batter in a continuous stream and under uniform pressure to said supply conduit, a plurality of stuffing nozzles mounted adjacent said conduit and adapted to receive in telescoped relation thereon empty sausage casings, a flow metering device connected to each of said nozzles, a connection between each metering device and the supply conduit, each metering device having a rotatable operating element, a power drive shaft, a clutch mechanism connecting each metering device operating element with said power drive shaft, a power driven casing gripping and feeding mechanism mounted adjacent the discharge end of each of said stuffing nozzles, said casing feeding mechanism being adapted to move from an operative casing feeding position where it receives the casing and advances the same away from the stuffing nozzle to a non-feeding position so as to permit the nozzle to be reloaded with an empty casing when the supply of casing thereon is exhausted, and means operative by movement of said casing gripping and feeding mechanism to engage and disengage the clutch connecting the operating element of the metering device of the associated stuffing nozzle with the power drive shaft thereby to discontinue the flow of batter through the nozzle when the casing feeding mechanism is moved to non-feeding position.

2. A sausage stuffing and feeding apparatus comprising a supply conduit, means to deliver a sausage batter in a continuous stream and under uniform pressure to said supply conduit, a plurality of stuffing nozzles mounted adjacent said conduit and adapted to receive in telescoped relation thereon empty sausage casings, a batter flow metering device supporting each of said nozzles, a connection between each metering device and the supply conduit, each metering device having a rotatably mounted flow control member, a power drive shaft, a clutch mechanism connecting each flow control member with said power drive shaft, a power driven feeding mechanism for the stuffed casing mounted adjacent the discharge end of each of said stuffing nozzles, said casing feeding mechanism being manually movable into and out of an operative position where it receives the stuffed casing and advances the same away from the stuffing nozzle, and means responsive to movement of said casing feeding mechanism into and out of said operative position to engage and disengage the clutch connecting the flow control member of the metering device of the associated stuffing nozzle with the power drive shaft thereby to stop the flow of batter through the nozzle when the casing feeding device is moved out of operative position.

3. A sausage stuffing and feeding apparatus as recited in claim 2, and said casing feeding mechanism comprising a mounting bracket, a pair of casing feeding rollers rotatably mounted thereon, a power drive shaft, and a gear train connecting said rollers with the power drive shaft.

4. A sausage stuffing and feeding apparatus as recited in claim 3, and said means for engaging and disengaging the clutch connecting the flow control member of the metering device with the power drive comprising a cam operated arm and a cooperating cam on the movable mounting bracket for the casing feeding mechanism.

5. A meat stuffing apparatus comprising a supply conduit, means to feed a meat mixture continuously and under uniform pressure to said supply conduit, a plurality of stuffing nozzles disposed in parallel relation adjacent said conduit, each said nozzle being adapted to receive in telescoped relation thereon empty sausage casings, a flow metering device supporting each of said nozzles, a fluid connection between each metering device and the supply conduit, each metering device having a rotatable operating element, a power drive shaft, a clutch mechanism connecting each said operating element with said power drive shaft, a stuffed casing gripping and feeding device arranged adjacent the discharge end of each of said stuffing nozzles, said casing feeding device comprising a mounting bracket and a pair of casing gripping feed rolls thereon, a cross drive shaft, means pivotally mounting said bracket on said drive shaft so that it is adapted to swing from an operative position where the casing is received between the feed rolls at the end of the stuffing nozzle to an inoperative position providing access to the nozzle for reloading with an empty casing when the supply of casing thereon is exhausted, and means operative by movement of said mounting bracket to engage and disengage the clutch connecting the operating element of the metering device of the associated stuffing nozzle with the power drive shaft whereby the flow of batter through the nozzle is stopped when the casing feeding device is moved to non-feeding position.

6. An apparatus for stuffing a fluid product into a flexible casing comprising a supply conduit, means to deliver the product in a continuous stream and under uniform pressure to said supply conduit, a plurality of stuffing nozzles mounted adjacent said conduit and adapted to receive in telescoped relation thereon empty lengths of casings, a flow metering device supporting each of said nozzles, a connection between each metering device and the supply conduit, each metering device having a rotatably mounted flow control member, a power drive shaft, a clutch mechanism connecting each flow control member with said power drive shaft, a power driven feeding mechanism for the casing mounted adjacent the discharge end of each of said stuffing nozzles, said casing feeding mechanism comprising a pair of feed rollers swingable into and out of casing gripping position where the stuffed casing is fed away from the stuffing nozzle by said feed rollers, and means operative in response to swinging movements of said casing feeding mechanism to engage and disengage the clutch connecting the flow control member of the metering devices of the associated stuffing nozzle and the power drive shaft thereby to stop the flow through the nozzle when the casing feed rollers are swung out of casing gripping position.

7. A sausage stuffing and linking apparatus comprising a plurality of stuffing nozzles adapted to receive in telescoped relation thereon shirred lengths of empty sausage casing, a batter supply line for delivering sausage batter in a continuously moving stream and under uniform pressure, means including a flow metering device connecting each of the nozzles to the batter supply delivering means, means for operating the flow metering devices to feed the batter through the nozzles and provide a continuously moving stream of the batter from the mouths of the nozzles into the casings so as to continuously fill the casings and advance the filled casings beyond the nozzles and means including a continuously traveling conveyor for receiving the uniformly filled casings advancing from the nozzles and for dividing the casing from each nozzle into a plurality of connected links of uniform size by constricting the casing at predetermined equally spaced intervals whereby the linked casings are held on the conveyor and advanced away from said nozzles.

8. A sausage stuffing and linking apparatus comprising a plurality of stuffing nozzles arranged in parallel relation and adapted to receive in telescoped relation thereon shirred lengths of empty sausage casings, a batter supply line for delivering sausage batter in a continuously moving stream and under uniform pressure, means including a power driven flow metering device connecting each of the stuffing nozzles to the batter supply line, a common power means for operating each of the metering devices so as to feed the batter with a constant uniform flow through the stuffing nozzles and in a continuously moving stream from the ends of the nozzles thereby to continuously fill the casings and advance the filled casings due to pressure of the oncoming batter beyond the ends of the stuffing nozzles, a traveling conveyor having link forming and holding cross bar assemblies spaced at uniform distances longitudinally thereon, said conveyor being supported with a top run thereof adjacent said stuffing nozzles and advancing in the same general direction as the long axis of the stuffing nozzles so as to receive the stuffed casing on said cross bar assemblies, said cross bar assemblies having slots therein which slots are aligned substantially with the stuffing nozzles and with each other longitudinally of the conveyor for receiving constricted sections of the casings, and means adjacent the nozzles and co-operating with the cross bar assemblies for positioning the casings in the slots in successive cross bar assemblies whereby to constrict the casings at intervals and divide each stuffed casing into a plurality of links of uniform size while the stuffed casing is continuously advancing.

9. A sausage stuffing and linking apparatus comprising a plurality of stuffing nozzles disposed in substantially parallel relation and adapted to receive in telescoped relation thereon empty sausage casing, means connected to a batter supply for delivering sausage batter to said nozzles under uniform pressure and in a continuously moving stream which includes a flow metering device connected with each of the nozzles for controlling the flow of batter to the individual nozzles, and means for operating the flow metering devices to feed the batter through each of the nozzles so as to provide a continuously moving stream thereof at the end of each nozzle and to continuously fill the casing and force the filled casing to advance beyond the end of the nozzle, a traveling conveyor having a run thereof extending in advance of said nozzles and traveling in a direction corresponding generally to the direction of the long axes of the nozzles, cross bars spaced equal distances lengthwise of said conveyor and having casing constricting notches which are spaced transversely of the conveyor and substantially aligned with the nozzles for receiving the filled casing, and means co-operating with said cross bars as they advance beyond the nozzles to force the casing into the notches whereby to constrict the casing and divide the same into connected links of uniform size and to hold the stuffed casing in the notches so that it is continuously advanced by the traveling conveyor.

10. A sausage stuffing apparatus comprising a sausage batter supply conduit, means for delivering the batter to said conduit in a continuous stream and under uniform pressure, a plurality of stuffing nozzles mounted in parallel spaced relation along the conduit and each said nozzle being adapted to have a supply of empty sausage casing telescoped thereon, means connecting each of the nozzles with said conduit, a batter metering device in said connecting means, said metering device having a continuously driven rotating element which is operative to deliver to the associated nozzle equal amounts of the batter with a constant uniform flow and providing a continuous solid stream of batter at the end of the nozzle, a power shaft, means connecting the rotating elements of said metering devices to said power shaft whereby upon rotation of said power shaft the batter is delivered simultaneously through all the nozzles in uniform amounts and advanced into the casing at the end of each nozzle in a continuous stream, a continuously traveling conveyor, and associated means for dividing the filled sausage casings into links and for holding the links on the conveyor so they are advanced away from the nozzles, and means gripping the filled casings at the ends of the nozzles and advancing the casings to the conveyor.

11. A sausage stuffing apparatus comprising a plurality of stuffing nozzles each adapted to receive in telescoped relation thereon a quantity of empty sausage casing, means connected to a batter supply and to said nozzles for delivering sausage batter in a continuous stream and under uniform pressure, means for controlling the flow of the batter through each of the nozzles, means for operating the flow controlling means so as to feed the batter through all of the nozzles simultaneously, with the batter moving in a continuous stream from each nozzle mouth into the associated casing, a continuously traveling conveyor having a run thereof extending in advance of the stuffing nozzles and traveling in the direction of the long axes of the stuffing nozzles, said conveyor having casing constricting and holding cross bar assemblies spaced at equal distances longitudinally thereof, said cross bar assemblies having casing constricting devices spaced transversely of the conveyor which devices are aligned substantially with the stuffing nozzles and longitudinally of the conveyor, means adjacent the ends of the nozzles for gripping the filled casings and advancing the same to a predetermined position on the conveyor where the casings are aligned with the casing constricting devices on the cross bar assemblies, and means co-operating with said casing constricting devices for dividing the casings into connected links of uniform size.

12. A sausage stuffing apparatus comprising means for supplying a sausage batter, a nozzle feeding conduit, means for feeding the batter in a continuous stream and under uniform pressure to the nozzle feeding conduit, a series of stuffing nozzles mounted adjacent the nozzle feeding conduit, means including individual flow metering devices connecting the nozzles with the nozzle feeding conduit, said flow metering devices having continuously rotating elements for delivering equal quantities of the batter to the nozzles and providing a continuously moving stream thereof at the stuffing ends of the nozzles, and a common power drive means connected to the rotating elements of said metering devices whereby the batter is forced through each of the nozzles with a constant uniform flow and delivered in a continuously moving stream at the end thereof for stuffing.

References Cited in the file of this patent

UNITED STATES PATENTS

| | | |
|---|---|---|
| 1,639,270 | Potter | Aug. 16, 1927 |
| 2,854,689 | Muller | Oct. 7, 1958 |
| 3,059,272 | Millenaar | Oct. 23, 1962 |